US011381921B2

(12) United States Patent
Moenke et al.

(10) Patent No.: US 11,381,921 B2
(45) Date of Patent: Jul. 5, 2022

(54) ELECTRODYNAMIC ACOUSTIC TRANSDUCER WITH IMPROVED SUSPENSION SYSTEM

(71) Applicant: Sound Solutions International Co., Ltd., Beijing (CN)

(72) Inventors: Adrian Moenke, Vienna (AT); Christian Klaubauf, Vienna (AT); Ben-Daniel Keller, Vienna (AT)

(73) Assignee: Sound Solutions International Co., Ltd., Beijing (CN)

( * ) Notice: Subject to any disclaimer, the term of this patent is extended or adjusted under 35 U.S.C. 154(b) by 0 days.

(21) Appl. No.: 16/666,742

(22) Filed: Oct. 29, 2019

(65) Prior Publication Data

US 2020/0137500 A1 Apr. 30, 2020

(30) Foreign Application Priority Data

Oct. 30, 2018 (AT) .............................. A 50931/2018

(51) Int. Cl.
*H04R 9/06* (2006.01)
*H04R 9/02* (2006.01)
(Continued)

(52) U.S. Cl.
CPC ................. *H04R 9/06* (2013.01); *H04R 7/04* (2013.01); *H04R 7/18* (2013.01); *H04R 9/025* (2013.01);
(Continued)

(58) Field of Classification Search
CPC . H04R 7/04; H04R 7/18; H04R 9/025; H04R 9/043; H04R 9/045; H04R 9/046;
(Continued)

(56) References Cited

U.S. PATENT DOCUMENTS 4,190,746 A * 2/1980 Harwood ................. H04R 7/02 381/427
5,511,131 A 4/1996 Kohara et al.
(Continued)

FOREIGN PATENT DOCUMENTS

CN 206640781 U 11/2017
CN 206851020 U 1/2018
(Continued)

OTHER PUBLICATIONS

First Office Action issued for Austrian priority application A50931/2018, dated Jan. 17, 2019.
(Continued)

*Primary Examiner* — Huyen D Le
(74) *Attorney, Agent, or Firm* — Dykema Gossett PLLC

(57) ABSTRACT

An electrodynamic acoustic transducer is disclosed, which comprises at least one coil with a coil wire being wound around a loop axis and a magnet system being designed to generate a magnetic field transverse to a longitudinal extension of the coil wire and transverse to the loop axis. Furthermore, the electrodynamic acoustic transducer comprises a membrane, which is fixed to the at least one coil and to the magnet system or to a frame/housing of the electrodynamic acoustic transducer. In addition, the electrodynamic acoustic transducer comprises a suspension system, which is fixed to the at least one coil and to the magnet system or to said frame/housing. In detail, the suspension system is fixed to the at least one coil in a region of a side wall of the at least one coil, which is oriented parallel to the loop axis.

21 Claims, 5 Drawing Sheets

(51) Int. Cl.

| | |
|---|---|
| ***H04R 9/04*** | (2006.01) |
| ***H04R 7/04*** | (2006.01) |
| ***H04R 7/18*** | (2006.01) |

(52) U.S. Cl.
CPC ............. *H04R 9/043* (2013.01); *H04R 9/045* (2013.01); *H04R 9/046* (2013.01); *H04R 2307/204* (2013.01); *H04R 2307/207* (2013.01)

(58) Field of Classification Search
CPC ........ H04R 2207/021; H04R 2307/204; H04R 2307/207; H04R 7/20; H04R 9/06
See application file for complete search history.

(56) References Cited

U.S. PATENT DOCUMENTS

| | | | | |
|---|---|---|---|---|
| 6,526,151 | B1 * | 2/2003 | Peng | H04R 9/06 181/171 |
| 6,735,322 | B1 | 5/2004 | Watanabe | |
| 7,813,521 | B2 * | 10/2010 | Lim | H04R 9/063 381/396 |
| 9,712,921 | B2 | 7/2017 | Salvatti et al. | |
| 10,034,094 | B2 | 7/2018 | Perkins | |
| 2004/0213431 | A1 | 10/2004 | Mello | |
| 2007/0160257 | A1 | 7/2007 | Stiles | |
| 2011/0243364 | A1 | 10/2011 | Walter | |
| 2012/0087523 | A1 | 4/2012 | Gerkinsmeyer | |
| 2014/0270323 | A1 | 9/2014 | Permanian | |
| 2016/0057543 | A1 | 2/2016 | Salvatti et al. | |
| 2017/0070823 | A1 * | 3/2017 | Permanian | H04R 9/043 |
| 2017/0347204 | A1 | 11/2017 | Linghu et al. | |
| 2018/0301724 | A1 * | 10/2018 | Kong | H01M 8/04328 |
| 2019/0104369 | A1 * | 4/2019 | Kim | H04R 31/006 |

FOREIGN PATENT DOCUMENTS

| | | | |
|---|---|---|---|
| CN | 206993401 | U | 2/2018 |
| CN | 207968928 | U | 10/2018 |
| DE | 4317775 | A1 | 8/1994 |
| EP | 0942626 | A2 | 9/1999 |
| EP | 2111057 | A2 | 10/2009 |
| EP | 2348754 | A1 | 7/2011 |
| JP | 2002262389 | A | 9/2002 |
| WO | 2011007403 | A1 | 1/2011 |
| WO | 2012088518 | A2 | 6/2012 |
| WO | 2013007112 | A1 | 1/2013 |

OTHER PUBLICATIONS

China National Intellectual Property Administration, First Office Action issued in counterpart CN application 201911044945.2. dated Dec. 11, 2020.

China National Intellectual Property Administration, Search Report issued in counterpart CN application 201911044945.2. dated Dec. 11, 2020.

China National Intellectual Property Administration, Second Office Action issued in counterpart CN application 201911044945.2. dated Jul. 7, 2021.

* cited by examiner

ELECTRODYNAMIC ACOUSTIC TRANSDUCER WITH IMPROVED SUSPENSION SYSTEM

PRIORITY

This patent application claims priority to Austrian Patent Application No. A50931/2018, filed on Oct. 30, 2018, the disclosure of which is incorporated herein, in its entirety, by reference.

BACKGROUND OF THE INVENTION

The invention relates to an electrodynamic acoustic transducer, which comprises at least one coil, which has a coil wire being wound around a loop axis, and a magnet system being designed to generate a magnetic field transverse to a longitudinal extension of the coil wire and transverse to the loop axis. Furthermore, the electrodynamic acoustic transducer comprises a membrane, which is fixed to the at least one coil and to a frame of the electrodynamic acoustic transducer. Finally, the electrodynamic acoustic transducer comprises a suspension system, which is fixed to the at least one coil and to said frame.

An electrodynamic acoustic transducer of said kind is generally known. For example, U.S. Pat. No. 9,712,921 B2 discloses a microspeaker with a frame, a membrane, a voice coil, a magnet system and suspension members. A first suspension member is attached to the length sides and the width sides of the membrane and the frame. The first suspension member is within a first plane. A second suspension member is attached to the lower end of the voice coil and the frame. The second suspension member is in a second plane different from the first plane.

Disadvantageously, the contact area between the suspension system and the coil is comparably small when it comes to coils with slim cross section, which are to be used for large excursions and high sound power. These coils have a large extension in the direction of the loop axis, whereas the width of the coil (not its diameter) is comparably small. As a consequence, the connection between the suspension system and the coil may break during use thus limiting the lifetime of the electrodynamic acoustic transducer. In particular, a suspension system fixed to the coil by means of an adhesive may be peeled off the coil by the rocking or tumbling movement of the coil.

Furthermore, fixing the suspension system to the lower end of the voice coil leads to comparably high electrodynamic acoustic transducers what is a particularly undesired effect when the electrodynamic acoustic transducer is used in mobile devices, for example in ultra flat mobile phones.

SUMMARY OF THE INVENTION

On the above grounds, it is an object of the invention to overcome the drawbacks of the prior art and to provide an improved design for an electrodynamic acoustic transducer. In particular, this improved design shall avoid breakage of the connection between the suspension system and the coil thus increasing the lifetime of the electrodynamic acoustic transducer compared to known solutions. Moreover, the improved design shall provide comparably flat electrodynamic acoustic transducers.

The inventive problem is solved by an electrodynamic acoustic transducer as disclosed in the opening paragraph, wherein the suspension system is fixed to the at least one coil in a region of a side wall of the at least one coil, which is oriented parallel to the loop axis.

By the above measures, the connection of a suspension system to the coil of an electrodynamic acoustic transducer is improved, even in case of coils with slim cross section (i.e. coils with a large extension in the direction of the loop axis and a comparably small width, which for example is the difference of the outer radius of the coil minus its inner radius in case of a circular coil). In particular, the contact area between the suspension system and the coil can be made substantially larger compared to prior art electrodynamic acoustic transducers. In turn the connection between suspension system and the coil is durable thus increasing the lifetime of the electrodynamic acoustic transducer compared to prior art solutions, even in case of large excursions and high sound output. In particular, peeling the suspension system off the coil by the rocking or tumbling movement of the coil can be avoided or at least limited. Moreover, the electrodynamic acoustic transducer is very flat although it comprises a suspension system because the suspension system is fixed to the at least one coil in a region of its side wall.

The proposed design applies to speakers in general and particularly to micro speakers, whose membrane area is smaller than 600 $mm^2$ and/or whose back volume is in a range from 200 $mm^3$ to 6 $cm^3$. Such micro speakers are used in all kind of mobile devices such as mobile phones, mobile music devices, laptops and/or in headphones. A diameter of the coil wire beneficially is ≤110 m in such cases so as to allow for compact coils with a high number of windings and for a proper movement of the membrane. It should be noted at this point, that a micro speaker does not necessarily comprise its own back volume but can use a space of a device, which the speaker is built into, as a back volume. That means the speaker does not comprise its own (closed) housing but just an (open) frame. The back volume of the devices, which such speakers are built into, typically is smaller than 10 $cm^3$.

The electrodynamic acoustic transducer may comprise a frame and/or a housing.

A "frame" commonly is a part, which holds together the membrane, the coil and the magnet system. Usually, the frame is directly connected to the membrane and the magnet system (e.g. by means of an adhesive), whereas the coil is connected to the membrane. Hence, the frame is fixedly arranged in relation to the magnet system. Normally, the frame together with the membrane, the coil and the magnet system forms a sub system, which is the result of an intermediate step in a production process.

A "housing" normally is mounted to the frame and/or to the membrane and encompasses the back volume of a transducer, i.e. an air or gas compartment behind the membrane. Hence, the housing is fixedly arranged in relation to the magnet system. In common designs, the housing can be hermetically sealed respectively air tight. However, it may also comprise small openings or bass tubes as the case may be. Inter alia by variation of the back volume respectively by provision of openings in the housing, the acoustic performance of the transducer can be influenced.

The membrane can be fixed to the at least one coil and to the magnet system or can be fixed to the at least one coil and to a frame of the electrodynamic acoustic transducer or can be fixed to the at least one coil and to a housing of the electrodynamic acoustic transducer. The same counts for the suspension system, which can be fixed to the at least one coil and to the magnet system or can be fixed to the at least one coil and to a frame of the electrodynamic acoustic transducer or can be fixed to the at least one coil and to a housing of the electrodynamic acoustic transducer.

Further advantageous embodiments are disclosed in the claims and in the description as well as in the figures.

In an advantageous embodiment of the electrodynamic acoustic transducer, the suspension system is fixed to the side wall of the at least one coil. In this way, a large contact area between the suspension system and the at least one coil can be obtained.

Advantageously, the suspension system may also be fixed to the side wall and a top wall of the at least one coil, which top wall is oriented transverse (particularly perpendicular) to the loop axis and faces the membrane. In this way, the membrane may be directly be fixed to the suspension system, e.g. by means of laser welding.

In a further advantageous embodiment of the electrodynamic acoustic transducer, the suspension system is fixed to a shoulder of the coil. Such a shoulder often is used to provide a desired distribution of the electromagnetic field of the coil. On the other hand, the shoulder can be used to fix the suspension system. Alternatively or in addition, the suspension system can be fixed to a sidewall or top wall of a coil having a shoulder.

The electrodynamic acoustic transducer may comprise a plurality of coils (in particular two coils or even more than two coils). In this case, it is of particular advantage, if the suspension system is arranged between two coils. In this way, a very good connection of the suspension system to the at least two coils can be obtained.

Beneficially, the suspension system forms a pot, wherein the loop axis intersects said pot. Accordingly, a line running on the suspension system around the at least one coil is a continuous line. In this way, the raw material for the suspension system may be a simple disc which is transformed into a pot, for example by a deep drawing process.

Beneficially, the suspension system may also form a closed ring around the loop axis. Accordingly, a line running on the suspension system around the at least one coil is a continuous line, too.

In a very advantageous embodiment of the electrodynamic acoustic transducer, the suspension system forms arms or legs or levers connecting the at least one coil to the magnet system or to the frame/housing. Accordingly, a line running on the suspension system around the at least one coil is a broken line.

In a very advantageous embodiment of the electrodynamic acoustic transducer, the at least one coil is polygonal in shape and the suspension systems is connected to the at least one coil only at its corners. In this way a very good damping of the base rocking mode and higher degrees of rocking modes (i.e. around axes perpendicular to the excursion direction of the coil) can be provided while at the same time the "suspension" of the suspension system in the direction of the loop axis (i.e. in the excursion direction or for the piston mode) is comparably low.

In the above context, it is of advantage if the magnet system is arranged in the region of the longitudinal sides of the at least one polygonal coil and discontinues in the region of the corners of the at least one polygonal coil. In other words, the magnet system generates a substantially strong magnetic field through the polygonal coil just in the region of the longitudinal sides of the polygonal coil. This solution allows for a comparably large magnet system in the region of the longitudinal sides of the polygonal coil without increasing the overall height of the electrodynamic acoustic transducer because of the suspension system. Instead, the magnet system discontinues in the region of the corners of the at least one polygonal coil thus providing space for the suspension system.

Advantageously, a ratio of a stiffness of the suspension system to a stiffness of the membrane in direction of the loop axis is below 1.5 and preferably in a range of 0.1 to 1.5. That means that the suspension system and the membrane have a similar stiffness in the direction of the loop axis (i.e. in the excursion direction), or the suspension system may also be substantially softer than the membrane. In this way, a movement of the membrane in the direction of the loop axis (i.e. an excursion of the membrane) is not hindered much by the suspension system.

In a further advantageous embodiment of the electrodynamic acoustic transducer, a ratio of a stiffness of the suspension system to a stiffness of the membrane in direction transverse (perpendicular) to the loop axis is below 1.5 and preferably in a range of 0.1 to 1.5. That means that the suspension system and the membrane have a similar stiffness in a direction transverse to the loop axis (i.e. transverse to the excursion direction), or the suspension system may also be substantially softer than the membrane. In this way, a center of rotation for a rocking movement of the membrane is pretty much in the center of gravity of the at least one coil. That is why the horizontal moving distance at the lower end of the coil is just the half horizontal moving distance of a coil without a suspension system. This is advantageous for the width of the magnet gap as well as for the sound quality and the efficiency of the electrodynamic acoustic transducer.

Advantageously, a ratio of a thickness of the membrane to a thickness of the suspension system measured in direction of the loop axis is in a range of 0.5 to 3.0. In this way, a stiffness of the membrane and a stiffness of the suspension system can be in a comparable range in direction of the loop axis and transverse to the loop axis.

Advantageously, the membrane and the suspension system can be made of the same material. Hence, the suspension system can be made in an efficient and economic way, as the material for the membrane has to be on stock anyway for the production of the electrodynamic acoustic transducer.

Beneficially, the membrane and/or the suspension system are made of one or more layers of Polyaryletherketone (PAEK), Acrylate, Thermoplastic Elastomeric (TPE), Polyetherimide (PEI), Polycarbonate (PC) and/or silicone rubber. In this way, good acoustic performance can be achieved. Nevertheless, other materials may be used for the membrane and/or the suspension system as well.

In a further advantageous embodiment of the electrodynamic acoustic transducer, a profile of the suspension system in a sectional plane parallel to the loop axis corresponds to a profile of the membrane in this plane, wherein a deviation of said profile of the suspension system and said profile of the membrane is less than 0.2 mm in a direction parallel to the loop axis. In other words, the membrane and the suspension system have the same profile or similar profiles in a sectional plane parallel to the loop axis. In this way the membrane and the suspension system are deformed synchronously or at least almost synchronously when the at least one coil is excursed.

In yet another advantageous embodiment of the electrodynamic acoustic transducer, a profile of the suspension system in a sectional plane parallel to the loop axis corresponds to a mirrored profile of the membrane in this plane mirrored around an axis transverse to the loop axis, wherein a deviation of said profile of the suspension system and said mirrored profile of the membrane is less than 0.2 mm in a direction parallel to the loop axis. In other words, the membrane and the suspension system again have the same profile or similar profiles in a sectional plane parallel to the loop axis, but wherein one profile is mirrored. In this way the membrane and the suspension system are deformed in an antiparallel way or in at least almost antiparallel way when the at least one coil is excursed.

Advantageously, a moving volume between the membrane and the suspension system is hermetically sealed or airtight. In this way, a coupling of the membrane and the suspension system is particularly strong. That is why an undesired wobbling or fluttering of the suspension system can be hindered. In particular, this coupling also hinders buckling of the suspension system when the at least one coil excessively moves towards the frame/housing as a compression/decompression of the air in the space between the membrane and the suspension system causes a counterforce. This effect can be increased even more if there is an overpressure in the moving volume, i.e. a pressure above the atmospheric pressure. In this way, tensile stress is caused in the membrane and the suspension system suppressing undesired wobbling, fluttering and buckling.

Advantageously, a moving volume between the membrane and the suspension system may also be permeable to air or non-airtight. In this way, a coupling of the membrane and the suspension system is rather loose, or strictly speaking coupling of the membrane and the suspension system is just done at their respective endpoints or edges. In this way the membrane may freely move. Accordingly, the quality of the output sound is not deteriorated by a strong coupling of the membrane and the suspension system.

BRIEF DESCRIPTION OF THE DRAWINGS

These and other aspects, features, details, utilities, and advantages of the invention will become more fully apparent from the following detailed description, appended claims, and accompanying drawings, wherein the drawings illustrate features in accordance with exemplary embodiments of the invention, and wherein:

FIG. 8 shows an exploded view of two coils with a suspension system in-between.

Like reference numbers refer to like or equivalent parts in the several views.

DETAILED DESCRIPTION OF EMBODIMENTS

Figure 1:
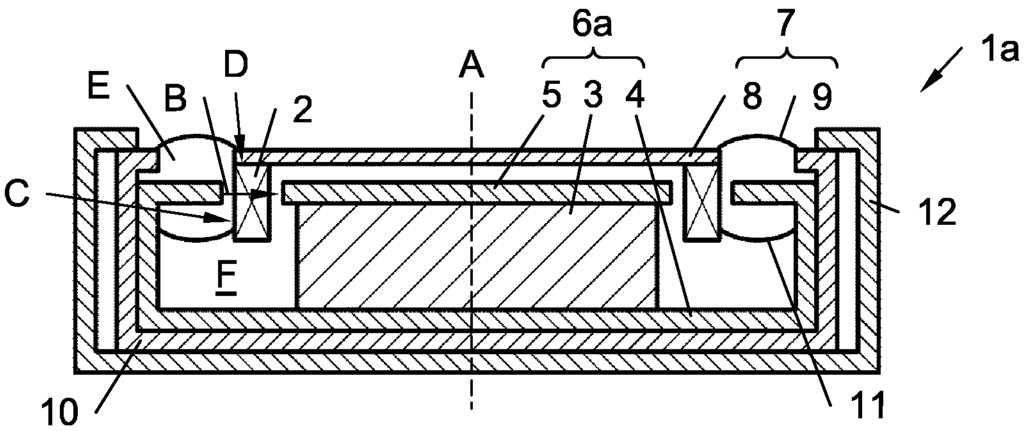
FIG. 1 shows a cross sectional view of a first exemplary transducer with the profiles of the membrane and the suspension system oriented antiparallel.

Various embodiments are described herein to various apparatuses. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It must be noted that, as used in this specification and the appended claims, the singular forms "a," "an" and "the" include plural referents unless the content clearly dictates otherwise.

The terms "first," "second," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

All directional references (e.g., "plus," "minus," "upper," "lower," "upward," "downward," "left," "right," "leftward," "rightward," "front," "rear," "top," "bottom," "over," "under," "above," "below," "vertical," "horizontal," clockwise," and "counterclockwise") are only used for identification purposes to aid the reader's understanding of the present disclosure, and do not create limitations, particularly as to the position, orientation, or use of the any aspect of the disclosure. It is to be understood that the terms so used are interchangeable under appropriate circumstances such that the embodiments of the invention described herein are, for example, capable of operation in other orientations than those illustrated or otherwise described herein.

As used herein, the phrased “configured to,” “configured for,” and similar phrases indicate that the subject device, apparatus, or system is designed and/or constructed (e.g., through appropriate hardware, software, and/or components) to fulfill one or more specific object purposes, not that the subject device, apparatus, or system is merely capable of performing the object purpose.

Joinder references (e.g., “attached,” “coupled,” “connected,” and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

All numbers expressing measurements and so forth used in the specification and claims are to be understood as being modified in all instances by the term “about” or “substantially,” which particularly means a deviation of ±10% from a reference value.

FIG. 1 shows a cross sectional view of a first example of an electrodynamic acoustic transducer 1*a*. The transducer 1*a* comprises a coil 2, which has a coil wire being wound around a loop axis A (note that the coil wire is not explicitly shown in FIG. 1). The electrodynamic transducer 1*a* also comprises a center magnet 3, a pot plate 4 and a top plate 5 together forming a magnet system 6*a* of the transducer 1*a*. The magnet system 6*a* generates a magnetic field B transverse to a longitudinal extension of the coil wire and transverse to the loop axis A in a magnet gap between the pot plate 4 and the top plate 5. Furthermore, the electrodynamic acoustic transducer 1*a* comprises a membrane 7, which comprises a center section 8 stiffened by means of a membrane plate and a bending section 9. The electrodynamic acoustic transducer 1*a* of this example also comprises an optional frame 10 which is arranged around the magnet system 6*a*. In this example, the membrane 7 is fixed to the frame 10 of the electrodynamic acoustic transducer 1*a*. In addition, the electrodynamic acoustic transducer 1*a* comprises a suspension system 11, which is fixed to the magnet system 6*a* and to the coil 2 in a region of its side wall C, which is oriented parallel to the loop axis A. Finally, the exemplary transducer 1*a* comprises an optional housing 12. Generally, the coil 2 comprises a sidewall C and a top wall D.

It should be noted that although the membrane 7 of this example is fixed to the frame 10 and although the suspension system 11 is fixed to the magnet system 6*a*, other possibilities are possible as well. For example, the membrane 7 could be fixed to the coil 2 and to said magnet system 6*a*. The suspension system 11 could be fixed to the coil 2 and to said frame 10.

In other embodiments, the frame 10 and/or the housing 12 need not to exist at all and can be omitted. In this case, the membrane 7 is fixed to the coil 2 and to the magnet system 6*a*, and the suspension system 11 is fixed to the coil 2 and to said magnet system 6*a*. However, if there is a frame 10, the membrane 7 can be fixed to the coil 2 and to the frame 10, and the suspension system 11 can be fixed to the coil 2 and to said frame 10. If there is a housing 12, the membrane 7 can be fixed to the coil 2 and to the housing 12, and the suspension system 11 can be fixed to the coil 2 and to said housing 12.

Summarizing, the membrane 7 can be fixed to the magnet system 6*a* and/or the frame 10 and/or the housing 12. The same counts for the suspension system 11, which can be fixed to the magnet system 6*a* and/or the frame 10 and/or the housing 12 as well.

The transducer 1*a* generally can be embodied as a loudspeaker and in particular as a micro speaker, whose membrane area is smaller than 600 $mm^2$ and/or whose back volume F is in a range from 200 $mm^3$ to 6 $cm^3$. A diameter of the coil wire beneficially is ≤110 m in such cases so as to allow for compact coils 2 with a high number of windings and for a proper movement of the membrane 7. In this way, the electrodynamic transducer 1*a* may be used for all kind of mobile devices like mobile phones, laptops, earphones, etc.

In the example of FIG. 1, the profile of the suspension system 11 in a sectional plane parallel to the loop axis A (i.e. in the plane of projection of FIG. 1) corresponds to a mirrored profile of the membrane 7 in this plane mirrored around an axis transverse to the loop axis A. A deviation of said profile of the suspension system 11 and said mirrored profile of the membrane 7 preferably is less than 0.2 mm in a direction parallel to the loop axis A. In other words, the membrane 7 and the suspension system 11 have the same profile or similar profiles in a sectional plane parallel to the loop axis A, but wherein one profile is mirrored. In this way the membrane 7 and the suspension system 11 are deformed in an antiparallel way or in at least almost antiparallel way when the coil 2 is excursed.

Figure 2:
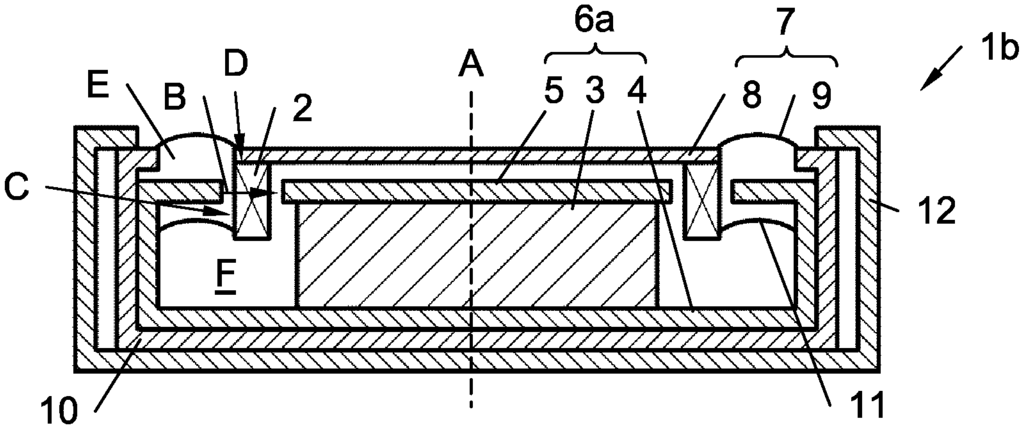
FIG. 2 shows a cross sectional view of another exemplary transducer with the profiles of the membrane and the suspension system oriented in parallel.

However, this is not the only possibility. FIG. 2 shows an embodiment of an electrodynamic acoustic transducer 1*b*, which is similar to the one of FIG. 1. In contrast, the profile of the suspension system 11 in a sectional plane parallel to the loop axis A (i.e. in the plane of projection of FIG. 2) corresponds to a profile of the membrane 7 in this plane (and not to the mirrored profile). A deviation of said profile of the suspension system 11 and said profile of the membrane 7 again preferably is less than 0.2 mm in a direction parallel to the loop axis A. In other words, the membrane 7 and the suspension system 11 have the same profile or similar profiles in a sectional plane parallel to the loop axis A. In this way the membrane 7 and the suspension system 11 are deformed synchronously or at least almost synchronously when the coil 2 is excursed.

In the embodiment of FIGS. 1 and 2 a moving volume E between the membrane 7 and the suspension system 11, i.e. enclosed by the frame 10, the membrane 7, the coil 2, the magnet system 6*a* and the suspension system 11 is considered to be hermetically sealed or airtight. In this way, the movement of the suspension system 11 can be coupled stronger to the movement of the membrane 7. In this way, an undesired wobbling or fluttering of the suspension system 11 can be hindered. In particular, this coupling also hinders buckling of the suspension system 11 when the coil 2 excessively moves towards the frame 10 as a compression/decompression of the air in the space between the membrane 7 and the suspension system 11 (i.e. in the moving volume E) causes a counterforce. This effect can be increased even more if there is an overpressure in the moving volume E, i.e. a pressure above the atmospheric pressure. In this way, tensile stress is caused in the membrane 7 and the suspension system 11 suppressing undesired wobbling, fluttering and buckling.

It should also be noted that a back volume F of the transducer 1*a*, 1*b* may be hermetically sealed or permeable to air so as to influence the sound quality of the transducer 1*a*, 1*b*.

Figure 3:
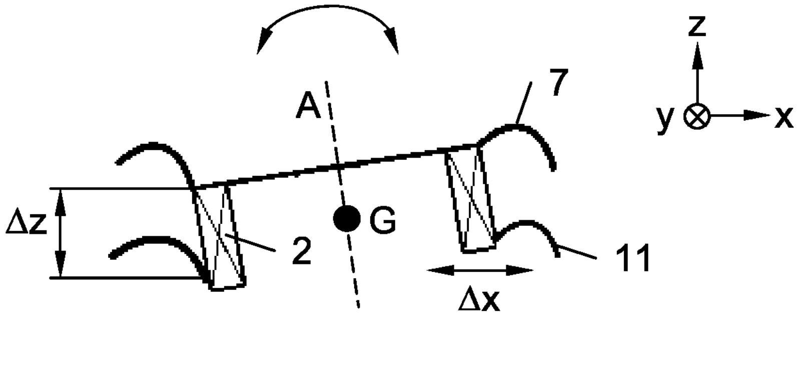
FIG. 3 shows what happens when the coil tumbles or rocks.

FIG. 3 shows what happens when the coil 2 tumbles or rocks. As can be seen, both the membrane 7 and the suspension system 11 are deformed thus causing a restoring moment counteracting the tumbling or rocking movement of the coil 2. By means of the suspension system 11, which in relation to the membrane 7 is connected to the coil 2 at a vertical distance Δz, the center of rotation G is shifted downwards compared to a solution without suspension system 11. That is why the horizontal moving distance Δx at the lower end of the coil 2 is just the half horizontal moving distance of a coil 2 without suspension system 11. In that, the air gap of the magnet system 6*a* can be made smaller thus improving the efficiency and sound quality of the transducer 1*a*, 1*b*.

Moreover, because of the vertical distance Δz, a comparably large restoring moments can be generated without stiffening the system against a movement in direction of the loop axis (piston mode). In this way, rocking modes defining rocking both around the x-axis and the y-axis can efficiently be damped without deteriorating the efficiency and power output of the transducer 1*a*, 1*b* much.

Figure 4:
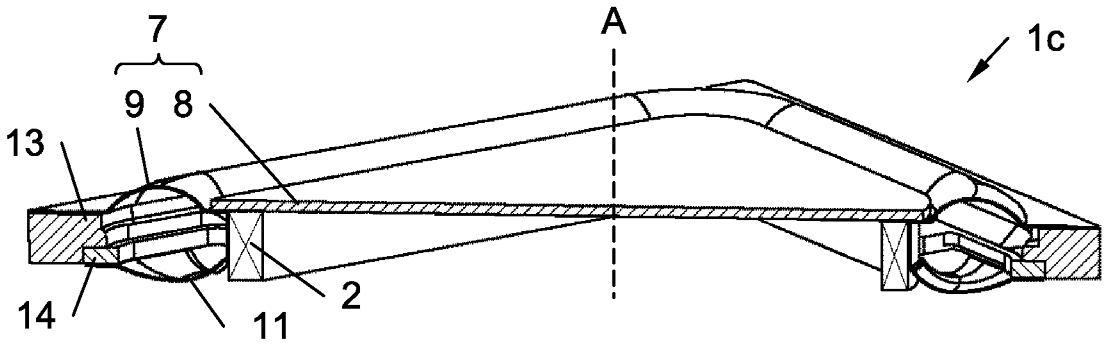
FIG. 4 shows an oblique cross sectional view of another exemplary transducer with the suspension system being fixed to the side wall and the top wall of the coil.
Figure 5:
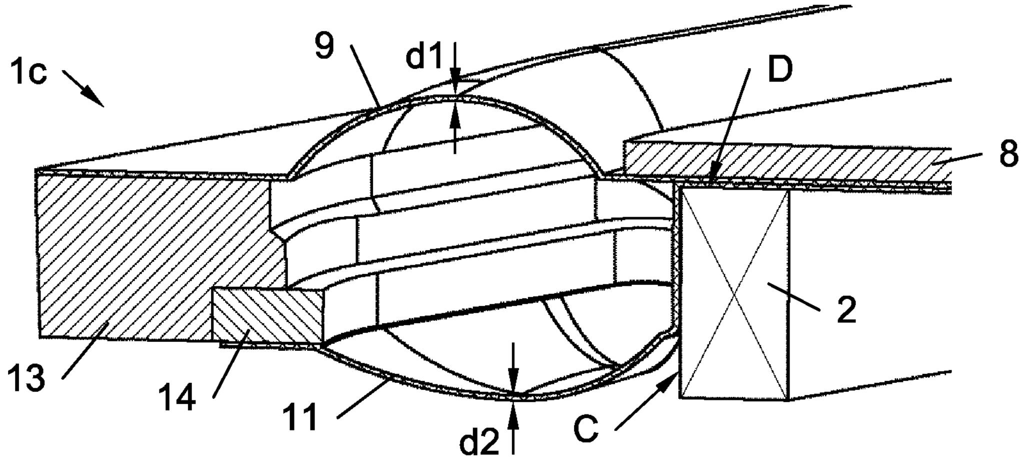
FIG. 5 shows a detailed view of the embodiment of FIG. 4.

FIG. 4 shows an oblique cross sectional view of another exemplary transducer 1*c*, and FIG. 5 shows a detailed view of the embodiment of FIG. 4. In this embodiment, the suspension system 11 is fixed to the side wall C and to the top wall D of the coil 2. The top wall D is oriented transverse (particularly perpendicular) to the loop axis A and faces the membrane 7. In this way, the membrane 7 may be directly be fixed to the suspension system 11, e.g. by means of laser welding.

Furthermore, FIGS. 4 and 5 show a membrane frame 13, which the outer region of the membrane 7 is fixed to, and a suspension system frame 14, which the outer region of the suspension system 11 is fixed to. In this way, the production of the transducer 1*c* may be eased as the membrane 7 and the suspension system 11 are easier to handle during the production process.

Furthermore, FIGS. 4 and 5 disclose that the thin material of the bending section 9 is continuous in the region of the center section 8 and is arranged below the stiffening plate of this section 8. This is an advantageous but not a mandatory solution. The material of the bending section 9 may also be interrupted in the region of the center section 8 or may be arranged above the stiffening plate of this section 8. The suspension system 11 forms a pot (with the upside down) in this example, wherein the loop axis A intersects said pot. Accordingly, a line running on the suspension system 11 around the coil 2 in a space between the coil 2 and the suspension system frame 14 is a continuous line.

Moreover, in FIG. 5 a thickness d1 of the membrane 7 and a thickness d2 of the suspension system 11 measured in direction of the loop axis A are explicitly denoted. The thickness d1 of the membrane 7 and a thickness d2 of the suspension system 11 are equal in the example shown in FIG. 5.

Figure 6:
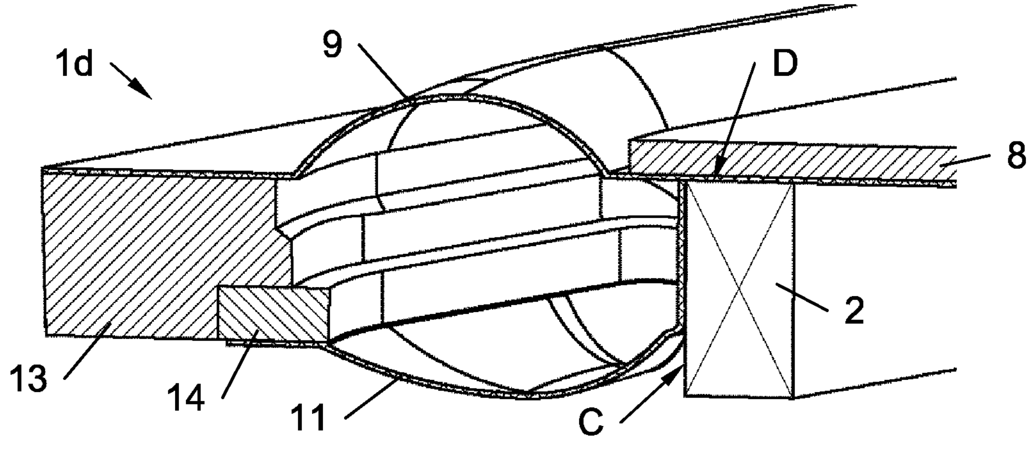
FIG. 6 shows an embodiment similar to the one of FIG. 5, but with the suspension system just fixed to the side wall of the coil.

FIG. 6 shows an embodiment similar to the one of FIG. 5, but with the suspension system 11 being only fixed to the side wall C of the coil 2. Still, the contact area between the suspension system 11 and the coil 2 is comparably large. In the embodiment of FIG. 6 the suspension system 11 forms a closed ring around the loop axis A. Accordingly, a line running on the suspension system 11 around the coil 2 in a space between the coil 2 and the suspension system frame 14 is a continuous line, too.

Figure 7:
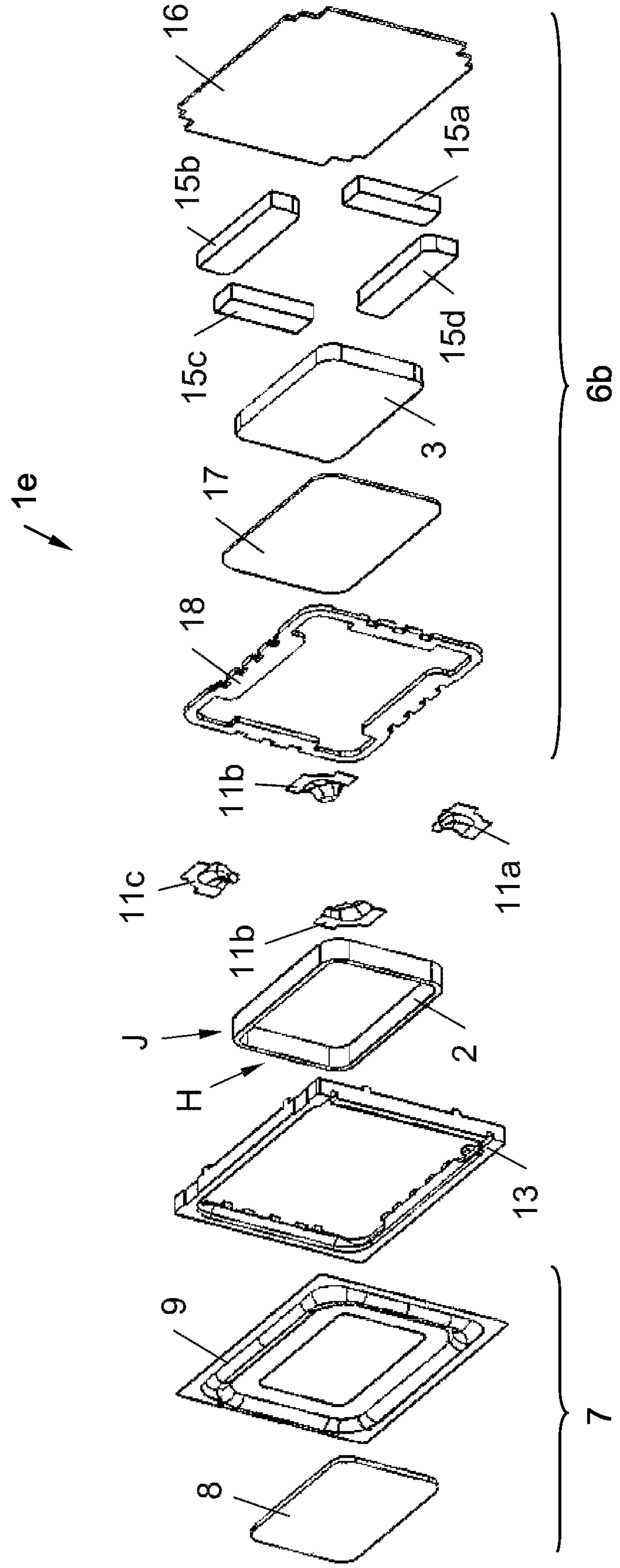
FIG. 7 shows an exploded view of a further example of a transducer with a membrane frame and an alternative magnet system.

FIG. 7 shows an exploded view of a further example of a transducer 1*e* with a membrane frame 13. The suspension system of FIG. 7 forms four arms/legs/levers 11*a* . . . 11*d*, which are fixed to the coil 2 and to the membrane frame 13, too. Accordingly, a line running on the suspension system 11*a* . . . 11*d* around the coil 2 in a space between the coil 2 and the membrane frame 13 is a broken line. In detail, the coil 2 is polygonal in shape, and the suspension systems 11*a* . . . 11*d* is connected to the coil 2 only at its corners J. In this way a very good damping of the base rocking mode and higher degrees of rocking modes can be provided while at the same time the "suspension" of the suspension system 11*a* . . . 11*d* in the direction of the loop axis A (i.e. in the excursion direction or in piston mode) is comparably low. That means that the arms/legs/levers 11*a* . . . 11*d* provide damping against rocking around the x-axis and the y-axis while the suspension in z-direction is kept low.

The magnet system 6*b* of the transducer 1*e* shown in FIG. 7 is a bit different to the magnet system 6*a* of the transducers 1*a*, 1*b* shown in FIGS. 1 and 2. In detail, the magnet system 6*b* comprises a center magnet 3, four side magnets 15*a* . . . 15*d*, a bottom plate 16, a center top plate 17 and a ring top plate 18.

The magnet system 6*b* is arranged in the region of the longitudinal sides H of the at least one polygonal coil 2 and discontinues in the region of the corners J of the at least one polygonal coil 2 (because there are single side magnets 15*a* . . . 15*d* and not a ring-shaped outer magnet). This solution allows for a comparably large magnet system 6*b* in the region of the longitudinal sides H of the polygonal coil 2 without increasing the overall height of the electrodynamic acoustic transducer 1*e* (what is the extension of the electrodynamic acoustic transducer 1*e* in z-direction) because of the suspension system 11*a* . . . 11*d*. Instead, the magnet system 6*b* discontinues in the region of the corners J of the at least one polygonal coil 2 thus providing space for the four arms/legs/levers 11*a* . . . 11*d*.

It should also be noted at this point, that the membrane frame 13 and/or the suspension system frame 14 shown in FIGS. 4 to 6 can be made of plastic but may also be part of the magnet system 6*a*, 6*b* and may (also) have the function of the ring top plate 18 if they are made of a magnetic permeable material. Equivalently, the ring top plate 18 shown in FIG. 7 may have the function of the membrane frame 13 and/or the suspension system frame 14, i.e. may be provided to hold the membrane frame 13 and/or the suspension system frame 14.

A moving volume E between the membrane 7 and the suspension system 11 is permeable to air or non-airtight in this example. In this way, a coupling of the membrane 7 and the suspension system 11 is rather loose allowing the membrane 7 to move more or less freely. Accordingly, the quality of the output sound is not deteriorated by a strong coupling of the membrane 7 and the suspension system 11.

Figure 8:
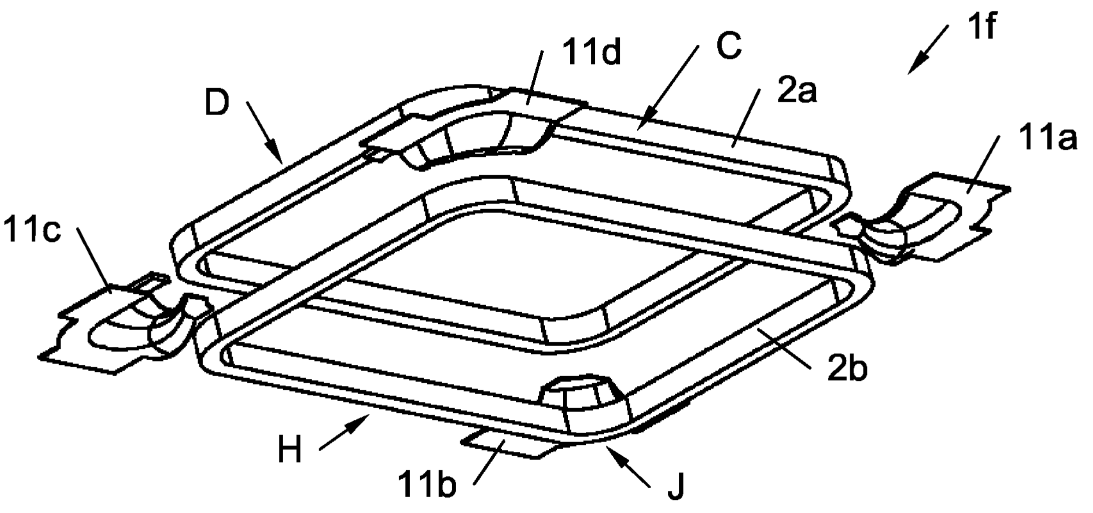
Figure 9:
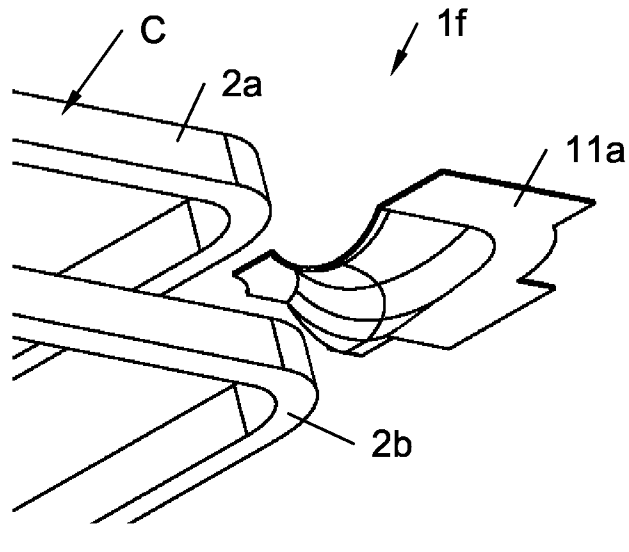
FIG. 9 shows a detailed view of FIG. 8.

The embodiments of FIGS. 1 to 7 just comprise one coil 2 each. However, this is not the only possibility, and an electrodynamic acoustic transducer 1*e* may also comprise a plurality of coils 2, in particular two coils 2*a*, 2*b* like this is the case in the example shown in FIG. 8. In such a case, the suspension system 11*a* . . . 11*d* may be arranged between two coils 2*a*, 2*b*. In this way, a very good connection of the suspension system 11*a* . . . 11*d* to the coils 2*a*, 2*b* can be obtained. Again, the suspension system forms four arms/legs/levers 11*a* . . . 11*d*, which are fixed to the coil 2*a*, 2*b* and the suspension system frame 14 only at their corners. Additionally, FIG. 9 shows a detailed view of FIG. 8.

Figure 10:
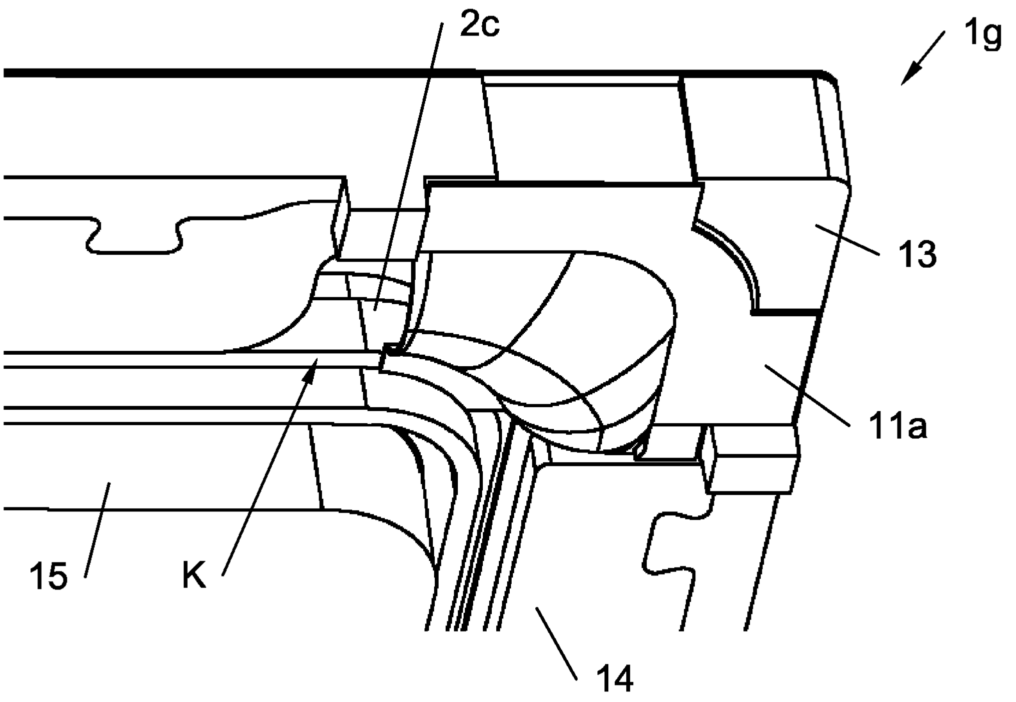
FIG. 10 shows an arrangement similar to the one of FIG. 9, but supplemented with a membrane frame and a suspension system frame.

FIG. 10 shows a further embodiment of an electrodynamic acoustic transducer 1*g*, which comprises a coil 2*c* with a shoulder K, which on the one hand is used to provide a desired distribution of the electromagnetic field B of the coil 2*c* and which on the other hand is used to fix the suspension system 11*a* . . . 11*d* to the coil 2*c*. Although the suspension system 11*a* . . . 111*d* is just fixed to the shoulder K of the coil 2*c* in this example, it should be noted that a suspension system 11, 11*a* . . . 11*d* may be fixed to a coil 2*c* having a shoulder K also in different ways. For example, the suspension system 11, 11*a* . . . 11*d* can be alternatively or additionally be fixed to the sidewall C of the coil 2*c* and also to the top wall D of the coil 2*c* (see FIGS. 1 to 6 in this context).

Figure 11:
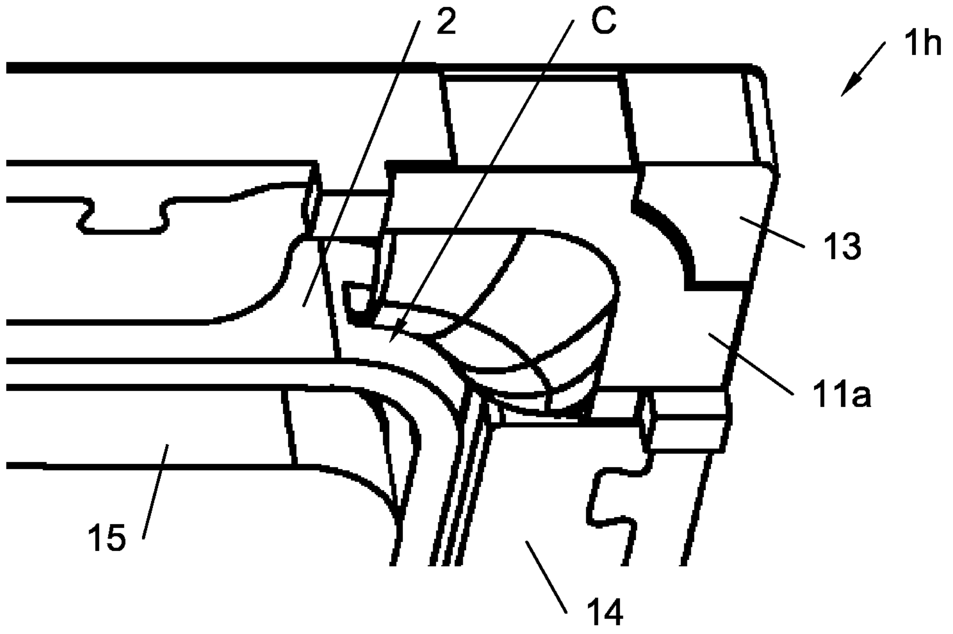
FIG. 11 shows an embodiment similar to the one of FIG. 10, but with the suspension system fixed to the side wall of the coil.

Finally, FIG. 11 shows an embodiment similar to the one of FIG. 10, but with the suspension system 11*a* . . . 11*d* fixed to the side wall C of the (single) coil 2.

Generally, the membrane 7 and the suspension system 11, 11*a* . . . 11*d* can be made of the same material. Accordingly, the suspension system can be made in an efficient and economic way, as the material for the membrane 7 has to be on stock anyway for the production of the electrodynamic acoustic transducer 1*a* . . . 1*h*.

Generally, the membrane 7 and/or the suspension system 11, 11*a* . . . 11*d* can be made of one or more layers of Polyaryletherketone (PAEK), Acrylate, Thermoplastic Elastomeric (TPE), Polyetherimide (PEI), Polycarbonate (PC) and/or silicone rubber. In this way, good acoustic performance can be achieved. Nevertheless, other materials may be used for the suspension system 11, 11*a* . . . 11*d* and/or the membrane 7 as well.

For all embodiments, it is also beneficial, if a ratio of a stiffness of the suspension system 11, 11*a* . . . 11*d* to a stiffness of the membrane 7 in direction of the loop axis A (or in direction z) is below 1.5 and preferably in a range of 0.1 to 1.5. Hence, the suspension system 11, 11*a* . . . 11*d* and the membrane 7 have a similar stiffness in the direction of the loop axis A (i.e. in the excursion direction), or the suspension system 11, 11*a* . . . 11*d* may also be substantially softer than the membrane 7. In this way, a movement of the membrane 7 in the direction of the loop axis A (i.e. an excursion of the membrane 7) is not hindered much by the suspension system 11, 11*a* . . . 11*d*.

Furthermore, it is beneficial for all embodiments if a ratio of a stiffness of the suspension system 11, 11*a* . . . 11*d* to a stiffness of the membrane 7 in direction transverse/perpendicular to the loop axis A (or in direction x or y) is below 1.5 and preferably in a range of 0.1 to 1.5. Hence, the suspension system 11, 11*a* . . . 11*d* and the membrane 7 have a similar stiffness in a direction transverse to the loop axis A (i.e. transverse to the excursion direction), or the suspension system 11, 11*a* . . . 11*d* may also be substantially softer than the membrane 7. In this way, a center of rotation G for a rocking movement of the membrane 7 is pretty much in the center of gravity of the coil 2 what is advantageous for the sound quality of the electrodynamic acoustic transducer 1*a* . . . 1*h*.

Generally, it is also of advantage, if a ratio of a thickness d1 of the membrane 7 to a thickness d2 of the suspension system 11, 11*a* . . . 11*d* measured in direction of the loop axis A is in a range of 0.5 to 3.0. In this way, a stiffness of the membrane 7 and a stiffness of the suspension system 11, 11*a* . . . 11*d* can be a comparable range in direction of the loop axis A and transverse to the loop axis A.

It should be noted that the invention is not limited to the above mentioned embodiments and exemplary working examples. Further developments, modifications and combinations are also within the scope of the patent claims and are placed in the possession of the person skilled in the art from the above disclosure. Accordingly, the techniques and structures described and illustrated herein should be understood to be illustrative and exemplary, and not limiting upon the scope of the present invention.

In particular, the curvature of the profile of the suspension systems 11, 11*a* . . . 11*d* of the transducers 1*c* . . . 1*h* may be oriented differently and look like the profile of the suspension system 11 in FIG. 2. Furthermore, the transducers 1*c* . . . 1*h* may have housings 12 like the embodiments shown in FIGS. 1 and 2 as the case may be. Moreover, a magnet system 6*a* of the style shown in FIGS. 1 and 2 may be used in the embodiments shown in FIGS. 3 to 11 and vice versa. In addition, the moving volume E in the embodiments of FIGS. 1 and 2 may be permeable to air like the moving volume E in the embodiments of FIGS. 3 to 11.

The scope of the present invention is defined by the appended claims, including known equivalents and unforeseeable equivalents at the time of filing of this application. Although numerous embodiments of this invention have been described above with a certain degree of particularity, those skilled in the art could make numerous alterations to the disclosed embodiments without departing from the spirit or scope of this disclosure.

LIST OF REFERENCES

1*a* . . . 1*h* electrodynamic acoustic transducer
2, 2*a* . . . 2*c* coil
3, 3*a* . . . 3*d* center magnet
4 pot plate
5 top plate
6*a*, 6*b* magnet system
7 membrane
8 center section (stiffening plate)
9 bending section
10 frame
11, 11*a* . . . 11*d* suspension system
12 housing
13 membrane frame
14 suspension system frame
15*a* . . . 15*d* side magnet
16 bottom plate
17 center top plate
18 ring top plate
A loop axis
B magnetic field
C sidewall of coil
D top wall of coil
E hermetically sealed moving volume
F back volume of the transducer
G center of rotation
H longitudinal side of the polygonal coil
J corner of the polygonal coil
K shoulder
d1 thickness of the membrane
d2 thickness of the suspension system
x, y, z coordinates
Δz vertical distance
Δx horizontal moving distance

What is claimed is:

1. An electrodynamic acoustic transducer, comprising:

at least one coil, the at least one coil having a coil wire being wound around a loop axis;

a magnet system being designed to generate a magnetic field transverse to a longitudinal extension of the coil wire and transverse to the loop axis;

a membrane, the membrane being fixed to the at least one coil and to either the magnet system or to a frame/housing of the electrodynamic acoustic transducer; and a suspension system, the suspension system being of a unitary construction and having an outer edge portion, a suspended portion and an inner fixing portion, wherein the outer edge portion is fixed to the magnet system or to said frame/housing, wherein the suspended portion is located between the magnet system or the said frame/housing and the at least one coil, and wherein the inner fixing portion is directly fixed to the at least one coil in a region of an outer side wall of the at least one coil, the outer side wall being oriented parallel to the loop axis, and the inner fixing portion covering more than half of the surface area of the outer side wall of the at least one coil.

2. The electrodynamic acoustic transducer as claimed in claim 1, characterized in that the inner fixing portion of the suspension system extends to the top of the outer side wall and across a top wall of the at least one coil, which top wall is oriented transverse to the loop axis and faces the membrane.

3. The electrodynamic acoustic transducer as claimed in claim 2, characterized in that the suspension system forms a pot, wherein the loop axis intersects said pot.

4. The electrodynamic acoustic transducer as claimed in claim 1, characterized in that the suspension system forms a closed ring around the loop axis.

5. The electrodynamic acoustic transducer as claimed in claim 1, characterized in that a ratio of a stiffness of the suspension system to a stiffness of the membrane in direction of the loop axis is below 1.5.

6. The electrodynamic acoustic transducer as claimed in claim 1, characterized in that a ratio of a stiffness of the suspension system to a stiffness of the membrane in direction transverse to the loop axis is below 1.5.

7. The electrodynamic acoustic transducer as claimed in claim 1, characterized in that a ratio of a thickness of the membrane to a thickness of the suspension system measured in direction of the loop axis is in a range of 0.5 to 3.0.

8. The electrodynamic acoustic transducer as claimed in claim 1, characterized in that the membrane and the suspension system are made of the same material.

9. The electrodynamic acoustic transducer as claimed in claim 1, characterized in that the membrane and/or the suspension system are made of one or more layers of Polyaryletherketone, Acrylate, Thermoplastic Elastomeric, Polyetherimide, Polycarbonate and/or silicone rubber.

10. The electrodynamic acoustic transducer as claimed in claim 1, characterized in that a profile of the suspension system in a sectional plane parallel to the loop axis corresponds to a profile of the membrane in this plane, wherein a deviation of said profile of the suspension system and said profile of the membrane is less than 0.2 mm in a direction parallel to the loop axis.

11. The electrodynamic acoustic transducer as claimed in claim 1, characterized in that a profile of the suspension system in a sectional plane parallel to the loop axis corresponds to a mirrored profile of the membrane in this plane mirrored around an axis transverse to the loop axis, wherein a deviation of said profile of the suspension system and said mirrored profile of the membrane is less than 0.2 mm in a direction parallel to the loop axis.

12. The electrodynamic acoustic transducer as claimed in claim 1, characterized in that a moving volume between the membrane and the suspension system is hermetically sealed.

13. The electrodynamic acoustic transducer as claimed in claim 1, characterized in that a moving volume between the membrane and the suspension system is permeable to air.

14. The electrodynamic acoustic transducer as claimed in claim 1, characterized in that the area of the membrane is smaller than 600 $mm^2$ and/or the back volume of the transducer is in a range from 200 $mm^3$ to 6 $cm^3$.

15. The electrodynamic acoustic transducer as claimed in claim 1, characterized in that a diameter of the coil wire is ≤110 μm.

16. An electrodynamic acoustic transducer comprising:

at least one coil, the at least one coil having a coil wire being wound around a loop axis, wherein an outer side wall of the at least one coil contains a shoulder located between a top of the outer side wall and a bottom of the outer side wall, the shoulder having a surface being perpendicular to the loop axis;

a magnet system being designed to generate a magnetic field transverse to a longitudinal extension of the coil wire and transverse to the loop axis;

a membrane, the membrane being fixed to the at least one coil and to either the magnet system or to a frame/housing of the electrodynamic acoustic transducer; and a suspension system, the suspension system having an outer edge portion, a suspended portion and an inner fixing portion, wherein the outer edge portion is fixed to the magnet system or to said frame/housing, wherein the suspended portion is located between the magnet system or the said frame/housing and the at least one coil, and the inner fixing portion is fixed to the shoulder of the at least one coil.

17. An electrodynamic acoustic transducer, comprising:

at least two concentric coils, each coil having a coil wire wound around a loop axis, the two coils being stacked one on top of the other in a direction parallel to the loop axis;

a magnet system being designed to generate a magnetic field transverse to a longitudinal extension of the coil wire and transverse to the loop axis;

a membrane, which is fixed to one of the at least two concentric coils and to either the magnet system or a frame/housing of the electrodynamic acoustic transducer; and a suspension system comprising an outer portion and an inner portion, the outer portion of the suspension system being fixed to either the magnet system or to said frame/housing, and the inner portion of the suspension system being fixed to a side wall of at least one of the at least two concentric coils.

18. The electrodynamic acoustic transducer as claimed in claim 17, wherein the inner portion of the suspension system is arranged between two of the at least two concentric coils.

19. The electrodynamic acoustic transducer as claimed in claim 17, characterized in that the suspension system comprises a plurality of arms or legs or levers connecting the at least two concentric coils to the magnet system or to the frame/housing.

20. The electrodynamic acoustic transducer as claimed in claim 19, characterized in that the at least two concentric coils are polygonal in shape and the plurality of arms or legs or levers of the suspension system are connected to the at least two coils only at the corners of the polygonal shape.

21. The electrodynamic acoustic transducer according to claim 20, characterized in that the magnet system is arranged in the region of the longitudinal sides of the at least two concentric polygonal coils and discontinues in the region of the corners of the at least two concentric polygonal coils.

* * * * *